UNITED STATES PATENT OFFICE.

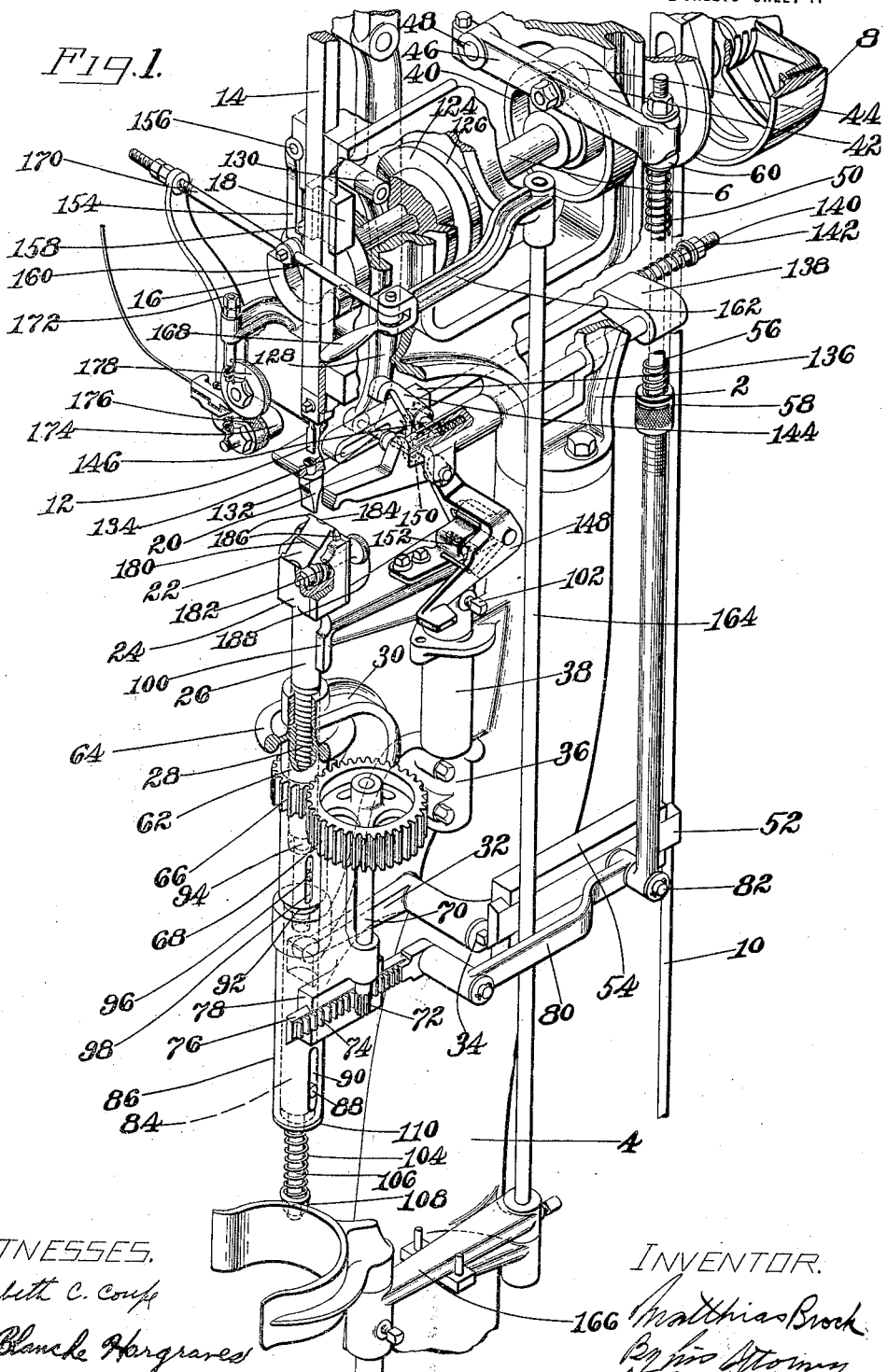

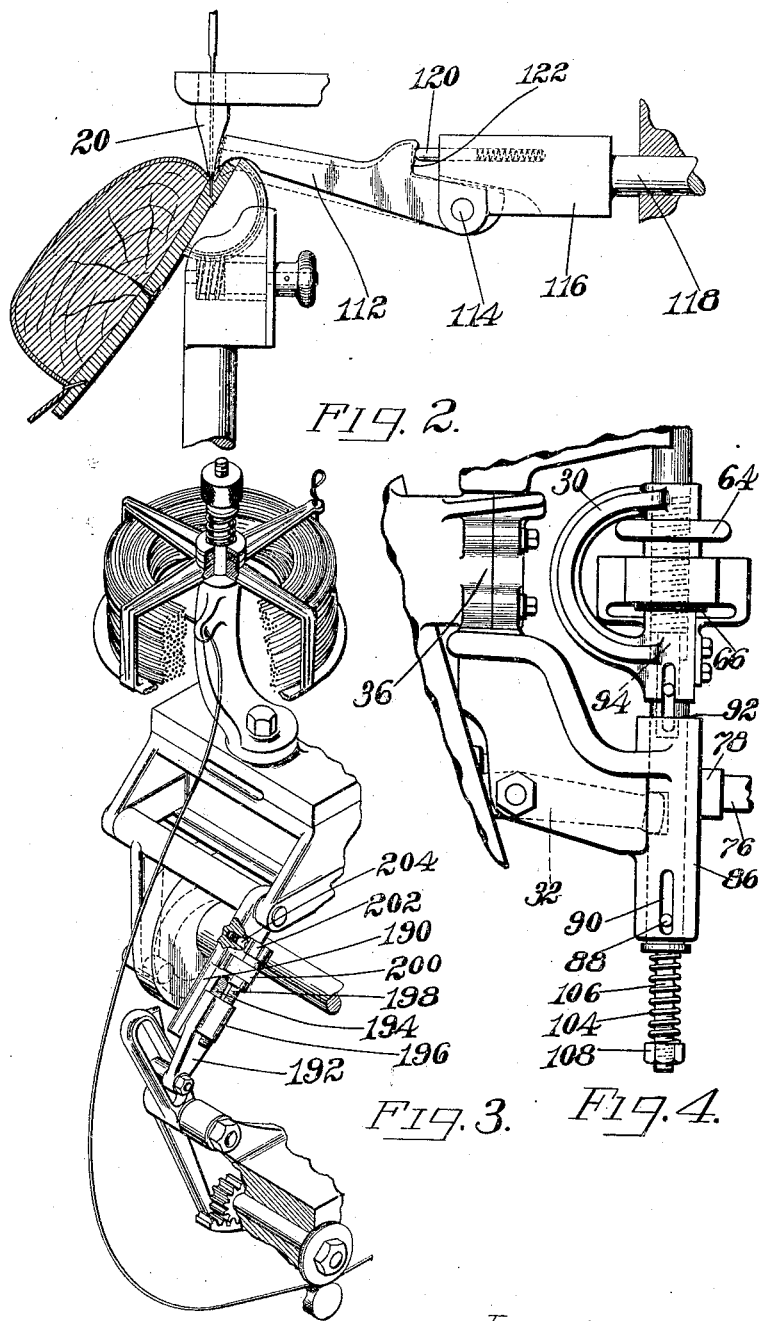

MATTHIAS BROCK, OF BOSTON, MASSACHUSETTS, ASSIGNOR TO UNITED SHOE MACHINERY COMPANY, OF PATERSON, NEW JERSEY, A CORPORATION OF NEW JERSEY.

STAPLE-LASTING MACHINE.

1,200,464.  Specification of Letters Patent.  Patented Oct. 10, 1916.

Application filed January 2, 1915. Serial No. 120.

*To all whom it may concern:*

Be it known that I, MATTHIAS BROCK, a citizen of the United States, residing at Boston, in the county of Suffolk and State of Massachusetts, have invented certain Improvements in Staple-Lasting Machines, of which the following description, in connection with the accompanying drawings, is a specification, like reference characters on the drawings indicating like parts in the several figures.

This invention relates to machines which are particularly adapted for use in lasting boots and shoes, the invention being herein shown as embodied in a machine intended especially for use in lasting stitch-down shoes.

A general object of the invention is to provide an organized machine, for the purposes above specified, which will be so nearly automatic that it can be operated easily and by comparatively unskilled operators.

More particularly the invention aims so to organize a machine for the purposes above specified that it may be quickly and accurately adjusted to operate effectively upon various kinds of work, that such adjustments may be made without danger of injury to the machine or to the work, that various combinations of the automatically operated mechanisms may be made without interrupting the operation of the machine upon the work, whereby varying lasting conditions may successfully be met, and generally so to construct and arrange the several elements of the machine that little attention will be required from the operator to make the machine perform satisfactorily the work for which it is intended.

Important features of the invention are the provision, with a lasting tool having an upper engaging end, of an automatically operated upper gripping jaw coöperating with said tool, preferably with a side face of said tool; the provision of means for rendering said automatically operating jaw operative or inoperative at the will of the operator; the provision of means for interrupting, at the will of the operator, the insertion of the lasting fastenings without interrupting the operation of the lasting instrumentalities; the provision of novel means for securing an accurate adjustment of the length of the lasting fastening, and the provision of means for automatically varying the relative movement of the lasting tool to suit it to the adjustment of the work support, whereby not only is the amount of lasting movement suited to the work, but danger of breakage of the machine by careless adjustment is avoided.

Other objects and important features of the invention will appear from the following description and claims when considered in connection with the accompanying drawings, in which:—

Figure 1 is a perspective view of the principal elements of a machine embodying the invention, parts of the frame being broken away and parts of the machine being removed in order to disclose elements of the essential mechanism which would otherwise be concealed; Fig. 2 is a detail view illustrating the operative relation of the lasting elements at the time the staple is driven; Fig. 3 is a perspective detail of the wire feeding mechanism, showing improved means for adjusting the feed of the wire to insure uniformity in the length of the legs of the staple; Fig. 4 is a side view in elevation illustrating in part the means for adjusting the amount of relative movement of the lasting tool and sole support.

As hereinabove suggested, the fastening which is preferably used for securing the parts of the shoe in lasted position is a staple and the mechanism for forming and driving this staple may be of well-known construction, the mechanism herein shown being substantially that of the machine for making and driving staples disclosed in United States Letters Patent No. 1,016,930, to W. H. Borden, granted February 13, 1912, except that the proportions of some parts of the machine are modified to permit the formation and insertion of a staple smaller than that usually handled by a machine of this construction and of finer wire, and that the staple guiding nozzle has been replaced by a member which is so constructed that it operates both as a lasting tool and as means for guiding the staple into position to secure the upper in lasted position after it has been acted upon by said tool.

The head 2 of the machine is mounted upon a suitable standard 4 and the staple forming and inserting mechanism is carried by the head, this mechanism being operated from a driving shaft 6 to which may be clutched, by any suitable clutch mechanism, a loose pulley 8 connected to the source of power. The clutch is preferably controlled from a treadle, not shown, in the base of the machine, through connections comprising a rod 10. The staple driver 12 is clamped to a driver bar 14, depressed by a spring in the manner shown in the Letters Patent above referred to and elevated by a lifting cam 16 which engages a block 18 upon said driver bar.

The staple, which is formed by forming mechanism substantially identical with that disclosed in the said Letters Patent, is driven by the driver 12 through the combined lasting tool and nozzle 20. Before the staple is driven a relative upper-drawing and wiping movement of the tool or nozzle 20 and the last takes place, whereby the upper is drawn over the last and wiped down the side of the last into the angle between the last and that part of the sole margin upon which the upper is to be outturned. The drawing of the upper over the last, as in the machine disclosed in the Letters Patent No. 1,117,087, to Adam H. Prenzel, granted November 10, 1914, is preferably effected by the relative movement of the tool or nozzle 20 and a sole support 22 upon which rests the sole of the shoe to be lasted, the sole support 22 being so inclined that during the relative movement of the sole support and the tool or nozzle the tool will engage the upper and wipe it down over the side of the last into the angle between the last and the sole margin. In the illustrated machine this movement is effected automatically and an important feature of the invention is the provision for adjustment to work of different thicknesses and for adjustment to different angles of insertion of the staple or of inclination of the sole with respect to the line of the relative lasting movement and also with respect to the line of insertion of the staple.

The illustrated means for effecting the relative upper stretching movement of the tool or nozzle 20 and the sole support 22 comprises a carrier 24 for the sole support mounted upon the upper end of a post 26 threaded at 28 for adjustment relative to a vertically movable bracket or yoke 30 having a pivotal connection to the forward end of a lever 32 fulcrumed at 34 upon a second bracket or arm 36 clamped upon a vertical shaft in a vertical bearing 38 upon the front of the standard 4. The bracket 30, and with it the post 26, carrier 24 and support 22, is reciprocated vertically through the connections with the lever 32, rocking motion being imparted to the lever 32 by connections with a cam groove 40 in a cam disk 42 in the main shaft 6, said connections comprising a cam roll 44 on a lever 46 fulcrumed at 48 on the machine head and provided at its free end with a vertical bore through which slides a rod 50 pivotally connected at its lower end to a dove-tailed slide 52 arranged to slide in a horizontal guide 54 in the end of the lever 32 remote from that which is connected to the bracket 30. Movement of the slide 52 varies the leverage of the lever 32 with respect both to the power and to the amount of movement transmitted to said lever through the rod 50. To provide yield in the connections between the cam groove 40 and the work support 22 in the event that the work support has clamped the work firmly before the movement of the lever 46 has been completed, a spring 56 is confined between an adjustable collar 58 threaded upon the rod 50 between its ends and a washer 60 surrounding the rod 50 and bearing against the lower face of the lever 46.

The adjustment of the slide 52 to vary the leverage of the lever 32 and to vary the amount of vertical movement imparted to the work support 22 is preferably effected in unison with the adjustment of the sole support 22 for different work thicknesses and in such manner that no matter what the adjustment of the work support 22 the said support will never come into contact with the nozzle 20. Breakage of these parts by careless adjustment is therefore avoided.

The coupling of the adjustment of the slide 52 with the adjustment of the post 26 in the bracket 30 is effected in the following manner: Mounted in the bracket 30 is a hand nut 62 provided with a hand wheel 64, the nut 62 being threaded upon the threaded part 28 of the post 26 so that by the turning of the nut 62 the post 26 will be moved relatively to the bracket 30. Integral with the hand nut 62 is an elongated pinion 66 which engages a gear 68 upon a vertical shaft 70 having its bearings in the bracket 36, said shaft 70 carrying at its lower end a pinion 72 which engages a horizontal rack 74 upon the dove-tailed slide 76 guided in a horizontal guide 78 in the bracket 36, said slide at its inner end being pivotally connected with a link 80 pivoted upon the pivot 82 which receives the rod 50. Movement of the slide 76 is thus transmitted to the slide 52.

To insure rectilinear movement of the post 26 along the line of insertion of the staple, the bracket or yoke 30 is provided with a cylindrical extension 84 which is adapted to slide in a vertical bore in a corresponding cylindrical extension 86 upon the bracket or arm 36, being held from turning in said bore by a pin 88 carried upon said extension 84 and extending into a slot 90 in the extension 86. The cylindrical extension of the bracket or yoke 30 is so reduced at 92 as to form a shoulder which may rest upon the outer face of the bracket 36.

The post 26 is reduced at its lower end and this reduced lower end 94 of the post 26 enters a bore in the cylindrical part of the bracket or yoke 30 and is prevented from turning in said bore by a pin 96 carried by a lug and entering the slot 98 in the cylindrical part of the bracket. The post 26 is also guided in a groove formed in the front part of a second arm or bracket 100 clamped upon the same vertical shaft to which the bracket 36 is clamped, this shaft being held from turning movement when the parts are in proper adjusted relation to the nozzle 20, by the set screw 102. The parts carried by the brackets 30 and 36 are yieldingly held in the relation to each other in which they are shown in Fig. 1 by means of a spring 104 surrounding the rod 106 attached to the lower end of the cylindrical extension 84 of the bracket 30, the spring being confined between a nut 108 threaded upon the lower end of said rod 104 and a washer 110 bearing against the lower face of the cylindrical extension 86 of the bracket 36.

In this machine, as in the machine of Letters Patent No. 1,117,087, hereinabove referred to, means is provided for gripping the upper by pressing it against the rear face of the nozzle when it is desired to stretch the upper more than it would be stretched by the relative movement of the nozzle and the work support and one of the important features of this invention is the provision of means for operating the gripping means automatically and for effecting a vertical movement of the gripping means after it has gripped the upper, whereby the upper will be drawn over the end of the nozzle at the same time that it is drawn down by the nozzle. The illustrated gripping means comprises a pivoted jaw 112 which is toothed at its end adjacent to the lasting tool or nozzle 20 so that it may engage firmly the under side of the upper and press it against the nozzle as shown in Fig. 2 of the drawings, this jaw being pivoted at 114 upon a horizontal slide 116 having a stem 118 guided in horizontal guides in the head 2. The jaw 112 is maintained yieldingly in its lowermost position by a spring-pressed plunger 120 which bears against a shoulder 122 upon said jaw. Horizontal movement is imparted to the slide 116 to move the jaw 112 into upper clamping relation to the nozzle 20 by connections with a cam groove 124 in a cam disk 126 upon the driving shaft 6, comprising a lever 128 fulcrumed upon the side of the machine head and having at its upper end a cam roll 130 which enters the cam groove 124 and carrying at its lower end a pin 132 extending through a slot 134 in a pawl carrying slide 136. The slide 136 is connected at its rear end to the stem 118 of the slide 116 by means of a block 138 attached to the stem 118 and provided with a bore through which the rear end of the slide 136 is adapted to slide, a spring 140 being confined between a nut 142 upon the threaded end of the slide 136 and the rear face of the block 138. Pivoted upon the slide 136 is a pawl 144 adapted to hook over the pin 132, which extends through the slot 134 sufficiently for this purpose and which is provided upon the end remote from the lever 128 with a head between which and the slide 136 the pawl 144 in confined. A spring 146 tends to move the pawl into a position in which it fits over the pin 132 so that if means were not provided for holding the pawl out of operative relation to the pin 132 the upper engaging jaw 112 would be normally operative.

To throw the jaw out of operation and hold it out of operation when its action is not necessary for proper lasting, a bell crank 148 is fulcrumed upon the arm or bracket 100, one arm of the bell crank being adapted to engage a downwardly extending tail 150 upon the pawl 144 and to rock said pawl upward about its pivot. A spring-pressed plunger 152 engaging one of two notches upon the inner face of one arm of the bell crank 148 tends to hold the bell crank in either of the two positions into which it may be moved. In Fig. 1 of the drawings the bell crank is shown in the position in which it holds the pawl 144 out of operative relation to the pin 132 and thus renders the gripping mechanism inoperative.

It is sometimes desirable to operate the machine without driving staples in order to effect a preliminary stretching and shaping of the upper before the upper is secured in lasted position. In order to operate the machine automatically for this purpose, means is provided for throwing the staple driver and the wire feeding mechanism out of operation. The illustrated means comprises a hook 154 pivoted at 156 upon the machine head and adapted to be moved into such position that it fits under a stop 158 upon the driver bar 14. This hook member is pivotally connected to a link 160 which at its other end is pivoted to the outer end of an arm 162 upon the vertical rock-shaft 164 mounted in bearings upon the side of the machine and adapted to be rocked by a knee lever 166 attached to its lower end. A handle 168 is provided upon the arm 162 so that the rock-shaft can be rocked by hand, if desired. Connected to the link 160 is a second link 170 attached to one arm 172 of a bell crank lever, the other arm 174 of which carries the lower wheel 176 of the wire feed mechanism. When the operator grasps the handle 168 or, through the knee lever 166 moves the arm 162 toward the right, the hook 154 will be moved under the stop 158 on the driver bar 14 and the bell crank 172 will be turned in such a direction that the feed wheel 176 will be separated from the upper feed wheel 178 and the wire feed will be stopped at the same time that the driver bar 14 is held from operation.

The sole support 22 is provided midway of its inclined surface with an offset 180 which serves to keep the sole from slipping down over the surface during the lasting operation when the upper is secured in lasting position. It is important that this break or offset in the sole engaging surface of the sole support be substantially in the same relation to the nozzle in all adjustments of the sole support, being preferably in the line of insertion of the staple. To this end the means for adjusting the inclination of the sole support is so arranged that it maintains the offset 180 in the line of drive in all inclinations of the sole support.

The illustrated means for adjusting the sole support comprises a worm 182 adapted to engage a worm thread 184 in the arc-shaped under surface of the sole support 22, the center of the arc of curvature of its under surface lying in the offset 180. The sole support 22 is provided upon its two sides with flanges 186 which are confined in arc-shaped grooves in the carrier 24. A knurled head 188 upon the worm 182 is located conveniently for the operator to adjust the inclination of the support 22 whenever the nature of the work requires such adjustment. The machine herein shown is provided with the usual means such as shown in the patent to Borden, No. 1,016,930, above identified, for changing the length of the staple, this means being so connected up to the wire feeding mechanism and the wire cutting mechanism that it serves to maintain the two legs of the staple substantially equal. It sometimes happens, however, that in spite of all mechanical precautions the machine will get out of adjustment, probably due to wear, so that the legs of the staple are not exactly equal. In driving staples of comparatively fine wire, such as are preferably used in this machine, it is quite important that the legs of the staple be kept of uniform length to provide a convenient adjustment in the automatic mechanism to compensate for inaccuracies that may arise due to wear, the arm 190, which corresponds to the arm 106 in the machine shown in the Borden patent, has been made in two relatively adjustable parts, the lower part 192 being slidable in a groove 194 in the upper part of said arm and being provided with a lug 196 into which is threaded an adjusting screw 198 confined in an ear 200 upon the part 190. The screw 198 has a notched head 202 which is held from turning by a spring-pressed pin 204 adapted to engage one of the notches. If preferred, the head 202 may be provided with pin openings into which a pin may be thrust to turn the screw 198.

Having fully described my invention, what I claim as new and desire to secure by Letters Patent of the United States is:

1. In a lasting machine, the combination with a lasting tool having an upper engaging end, and sole engaging means, of means for automatically moving said sole engaging means relatively to said lasting tool to force the upper engaged by said lasting tool into lasted position, and means for varying the amount of said automatic lasting movement.

2. In a lasting machine, the combination with a lasting tool having an upper engaging end, and sole engaging means, of automatic means for effecting a relative lasting movement of said tool and said sole engaging means, and means for varying the amount of said lasting movement while maintaining substantially constant the limit of approach of said tool and said sole engaging means.

3. In a lasting machine, the combination with a lasting tool and a work support, normally separated, of automatic means for effecting a relative lasting movement of said tool and said work support, and means for varying the extent of the normal separation of said tool and said work support constructed to vary the amount of relative lasting movement.

4. In a lasting machine, the combination with a lasting tool and a work support, of automatic means comprising a lever connected to said work support for effecting a relative lasting movement of said tool and said work support, and means for effecting a relative adjustment of said tool and said work support constructed to effect simultaneously a variation in the relative lengths of the arms of said lever.

5. In a lasting machine, the combination with a lasting tool and a work support, of automatic means for effecting a relative lasting movement of said tool and said work support, means for inserting a fastening through said tool when said lasting movement is completed, means for effecting a relative adjustment of said tool and said work support, and means for varying the length of said lasting fastening.

6. In a lasting machine, the combination with a lasting tool having an upper engaging end constructed and arranged to force the upper into the angle between the side of the last and the sole margin, sole engaging means, and means coöperating with said tool for gripping the upper, of means for automatically operating said gripping means.

7. In a lasting machine, the combination with a lasting tool having an upper engaging end, sole engaging means and means coöperating with said tool for gripping the upper, of means for automatically operating said gripping means, and means for throwing said gripping means out of operation to permit the lasting to be performed by said tool alone.

8. In a lasting machine, the combination with a lasting tool, of means coöperating with a face of said tool for gripping the upper, means for automatically effecting a relative lasting movement of the work and said tool, means for automatically operating said gripping means, and means under the control of the operator for interrupting the operation of said gripping means without interrupting the relative lasting movements of the tool and the work.

9. A staple lasting machine comprising, in combination, a lasting tool having an upper engaging end and having formed therein a staple guide, sole engaging means, means for effecting a relative lasting movement of said tool and said engaging means, means for forming and driving a staple through said tool to secure the upper in lasted position, said means being constructed and arranged to operate automatically in predetermined succession, and means for discontinuing the staple driving when it is desired to effect a series of lasting operations without securing the upper in lasted position.

10. In a lasting machine, the combination with a lasting tool having an upper engaging end, of means coöperating with a side face of said tool for gripping the upper, said means being arranged to travel over said side face after the upper is gripped.

11. In a lasting machine, the combination with a lasting tool having an upper engaging end, of a work support and upper gripping means, and means for causing a relative lasting movement of said work support and said tool and for causing said upper gripping means to draw the upper over the end of said tool.

12. In a lasting machine, the combination with a lasting tool having an upper engaging end, of a sole support, means for effecting a relative movement of said tool and said sole support, and means coöperating with a side face of said tool for gripping the upper, said means being arranged to be engaged by the sole support during said relative lasting movement to cause it to travel over said side face.

13. In a lasting machine, an inclined sole support having an offset in its sole supporting face, and a carrier for said sole support in which it is adjustable about an axis lying in said offset.

14. In a lasting machine, an inclined sole support having an offset in its sole supporting face, a carrier for said sole support in which it is adjustable about an axis lying in said offset, and means for turning said sole support about said axis.

15. In a lasting machine, the combination with a lasting tool having an upper engaging end, of a sole support, said tool and said support being relatively movable to effect a lasting operation and said support having an offset substantially in the line of said relative movement, and means for inclining said support more or less to the line of relative movement constructed to maintain said offset in said line of relative movement.

16. In a lasting machine, the combination with a lasting tool and a sole support, said tool and said support being relatively movable to effect a lasting operation and said support being normally inclined to the line of relative movement and having an offset substantially in said line, of means for varying the inclination of said support constructed to maintain said offset in said line of relative movement.

In testimony whereof I have signed my name to this specification in the presence of two subscribing witnesses.

MATTHIAS BROCK.

Witnesses:
HENRY KAHLMEYER,
ELIZABETH C. COUPE.

Copies of this patent may be obtained for five cents each, by addressing the "Commissioner of Patents, Washington, D. C."